United States Patent
Navarro (10) Patent No.: US 10,103,573 B2
(45) Date of Patent: *Oct. 16, 2018

(54) UPS SYSTEMS AND METHODS USING VARIABLE CONFIGURATION MODULES

(71) Applicant: Eaton Corporation, Cleveland, OH (US)

(72) Inventor: George Arthur Navarro, Raleigh, NC (US)

(73) Assignee: Eaton Intelligent Power Limited (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/478,600

(22) Filed: Apr. 4, 2017

(65) Prior Publication Data

US 2017/0207654 A1    Jul. 20, 2017

Related U.S. Application Data

(63) Continuation of application No. 13/936,741, filed on Jul. 8, 2013, now Pat. No. 9,647,491.

(51) Int. Cl.
*H02J 9/06* (2006.01)

(52) U.S. Cl.
CPC .............. *H02J 9/061* (2013.01); *H02J 9/062* (2013.01); *Y02B 10/72* (2013.01); *Y10T 307/615* (2015.04); *Y10T 307/62* (2015.04)

(58) Field of Classification Search
CPC .... H02J 9/062; H02J 9/061; H02J 9/06; H02J 2009/068; Y10T 307/62; Y10T 307/615; Y10T 307/625; Y02P 80/114; Y02P 80/11; Y02P 80/14; Y02B 10/72; G06F 1/30; G06F 1/263; G06F 1/305
See application file for complete search history.

(56) References Cited

U.S. PATENT DOCUMENTS

| | | | |
|---|---|---|---|
| 5,465,011 A * | 11/1995 | Miller | H02J 9/062 307/64 |
| 6,292,379 B1 | 9/2001 | Edevold et al. | |
| 6,700,351 B2 * | 3/2004 | Blair | H02J 7/0022 320/125 |

(Continued)

FOREIGN PATENT DOCUMENTS

| | | |
|---|---|---|
| CN | 1713480 | 12/2005 |
| CN | 201032693 | 3/2008 |
| EP | 1835694 | 9/2007 |
| WO | WO 01/73921 A2 | 10/2001 |
| WO | WO 2007/139577 A1 | 12/2007 |
| WO | WO 2010/038152 A1 | 4/2010 |

OTHER PUBLICATIONS

*Eaton Energy Saver System for Highest-Efficiency Power Protection*, Eaton, Technology Brief, Sep. 2009, pp. 1-7.

(Continued)

*Primary Examiner* — Ryan Johnson
(74) *Attorney, Agent, or Firm* — Ward and Smith, P.A.

(57) ABSTRACT

A UPS includes a first bridge circuit module, a second bridge circuit module, and a control circuit configured to operate the first bridge circuit module as an inverter and to selectively operate the second bridge circuit module as a bypass switch and a rectifier. The control circuit may be configured to operate the second bridge circuit module as bypass switch in a standby UPS mode and to operate the second bridge circuit module as a rectifier in an on-line UPS mode.

13 Claims, 10 Drawing Sheets

(56) References Cited

U.S. PATENT DOCUMENTS

| | | | |
|---|---|---|---|
| 7,045,914 B2 | 5/2006 | Liu .................. | H02J 9/061 |
| | | | 307/116 |
| 7,500,120 B2 | 3/2009 | Egan .................. | G06F 1/30 |
| | | | 713/300 |
| 7,508,094 B2* | 3/2009 | Johnson, Jr. ........... | H02J 9/062 |
| | | | 307/64 |
| 7,560,831 B2 | 7/2009 | Whitted et al. | |
| 7,886,173 B2 | 2/2011 | Krieger et al. | |
| 8,193,662 B1 | 6/2012 | Carlson et al. | |
| 8,344,546 B2 | 1/2013 | Sarti | |
| 9,362,781 B2 | 6/2016 | Costa .................. | H02J 9/00 |
| 9,647,491 B2* | 5/2017 | Navarro ............... | H02J 9/06 |
| 2005/0036253 A1 | 2/2005 | Tian et al. | |
| 2007/0210652 A1* | 9/2007 | Tracy .................. | H02J 9/062 |
| | | | 307/66 |
| 2008/0030078 A1 | 2/2008 | Whitted et al. | |
| 2011/0278933 A1* | 11/2011 | Anderson ............. | H02J 9/04 |
| | | | 307/66 |
| 2012/0074786 A1 | 3/2012 | Johnson, Jr. et al. | |
| 2012/0306274 A1 | 12/2012 | Shetler, Jr. et al. | |
| 2013/0154378 A1 | 6/2013 | Yang et al. | |

OTHER PUBLICATIONS

*Energy Efficient Data Centre UPS,* Eaton's Energy Advantage Architecture, 2011, pp. 1-48.

*Variable Module System,* Product Brochure, Nov. 2012, 2 pages.

Power Xpert 9395 UPS and Plus 1 UPS, (450-550 kVA), Installation and Operation Manual, Rev, 4, Eaton, www.eaton.com/powerquality, 2011-2013 pp. 6-20 thru 6-30.

Park, Jay, "Designing a Very Efficient Data Center", Facebook Engineering (Notes), Apr. 14, 2011, 5 pages.

Facebook Follows Good to Data Center Savins, Data Center Knowledge, Nov. 27, 2011, 6 pages.

Heiliger, Jonathan, "Breaking Ground on Our First Custom Data Center" The Facebook Blog, Jan. 21, 2010, 2 pages.

Eaton Technical Paper, "Understanding Eaton Energy Saver System" Oct. 2012, 18 pages.

International Search Report and Written Opinion Corresponding to International Application No. PCT/US2014/045344; Dated: Oct. 30, 2014; 8 Pages.

International Preliminary Report on Patentability Corresponding to International Application No. PCT/US2014/045344; Dated: Jan. 21, 2016; 5 Pages.

Data Center Knowledge, "Facebook Follows Google to Data Center Savings", Nov. 27, 2009, 6 Pages.

Heiliger, Jonathan, "Breaking Ground on Our First Custom Data Center", The Facebook Blog, Jan. 21, 2010, 2 Pages.

Navarro, George "Understanding Eaton Energy Saver System", Eaton Technical Paper, Oct. 2012, 18 Pages.

First Examination Report; Corresponding European Application No. EP 14744239.8; dated Jan. 25, 2017; 4 pages.

Chinese Office Action; CN Appln 201480038663.0; dated Dec. 5, 2017 (8 pages).

\* cited by examiner

UPS SYSTEMS AND METHODS USING VARIABLE CONFIGURATION MODULES

RELATED APPLICATIONS

The present application is a Continuation Application of U.S. patent application Ser. No. 13/936,741, filed Jul. 8, 2013, the disclosure of which is hereby incorporated in its entirety by reference.

BACKGROUND

The inventive subject matter relates to power conversion apparatus and methods and, more particularly, to uninterruptible power supply (UPS) apparatus and methods.

UPS systems are commonly used in installations such as data centers, medical centers and industrial facilities. UPS systems may be used in such installations to provide backup power to maintain operation in event of failure of the primary utility supply. UPS systems may have a modular structure including two or more UPS modules, each of which may include, for example, a rectifier, an inverter and a DC/DC converter for interfacing to a battery or other DC power source. The modules commonly are designed to operate in parallel to provide scalable power capacity, e.g., the modules may be coupled in common to an AC source, a DC source (e.g., a battery) and/or a load. An example of such a modular UPS system is the Eaton Power Xpert 9395 UPS system, which may be configured to include two or more uninterruptible power modules (UPMs), each of which include a double conversion UPS circuit including a rectifier, inverter and battery converter coupled to a common DC bus.

Large data centers have proliferated with the advent of web services and cloud computing. Some newer large data centers occupy millions of square feet and house hundreds of thousands of servers. Typically powered by the local grid, these centers may include backup power supply systems including UPSs and diesel-electric backup generators to support continued operation when utility power is lost. Energy consumption is a major concern for such facilities, as some facilities are approaching the 100 MW level. For such facilities, even a few percentage points of efficiency can translate into significant expense.

Techniques for improving UPS efficiency have been developed. For example, some double-conversion UPS systems support high-efficiency or "eco" modes in which the rectifier and inverter are bypassed when the input AC source meets certain criteria. Other solutions to increase data center energy efficiency, such as those described, for example, in U.S. Pat. No. 7,886,173 to Krieger et al., U.S. Pat. No. 7,560,831 to Whitted et al. and U.S. Pat. No. 8,344,546 to Sarti, include redundant power distribution techniques that avoid the use of traditional UPS architectures.

SUMMARY

Some embodiments of the inventive subject matter provide a system including a plurality of module locations configured for installation of uninterruptible power supply (UPS) modules and a control circuit configured to selectively support standby UPS and on-line UPS operation of modules installed at the plurality of module locations. The system may include a plurality of UPS modules installed in the plurality of module locations and including at least one UPS module configured to operate as a standby UPS. The plurality of UPS modules may further include at least one UPS module configured to operate as an on-line UPS.

In some embodiments, the plurality of UPS modules may share a common architecture including a submodule location at which a submodule is installable and circuitry configured to support operation of a submodule in the submodule location as a rectifier for on-line UPS operation or as a bypass switch for standby UPS operation. The UPS modules may each include an inductor assembly coupled to the submodule location and configured to operate as an energy storage device when a submodule installed in the submodule location is operated as a rectifier and to operate as a current limiter when a submodule installed in the submodule location is operated as a bypass switch.

Further embodiments provide a UPS system including a plurality of UPS module locations and at least one UPS module installed at a corresponding at least one of the plurality of UPS module locations. The at least one UPS module includes an inverter submodule and a switch submodule configured to selectively bypass the inverter submodule. The at least one UPS module may be configured to support a standby mode of UPS operation wherein power is provided to a load coupled to the at least one UPS module from an external AC source via the switch submodule in a first state and power is provided to the load from a battery via the inverter submodule in a second state.

The switch submodule may be installed in a submodule location configured to interchangeably support various types of submodules that provide at least one different function than the switch submodule. The various submodules may include a rectifier submodule.

In some embodiments, at least one UPS module may include a first UPS module installed at a first one of the UPS module locations and comprising the inverter submodule and the switch submodule and the system may further include a second UPS module installed at a second one of the UPS module locations and comprising an inverter submodule and a rectifier submodule. The switch submodule and the rectifier submodule may be installed in a common submodule location in the respective first and second UPS modules.

In some embodiments, the at least one UPS module may include a first UPS module at a first one of the UPS module locations and configured be coupled to a first AC source and a second UPS module at a second one of the UPS module locations and configured to be coupled to a second AC source. The first and second UPS modules may be configured to be coupled to respective first and second loads.

In some embodiments, a system includes a plurality of UPS module locations and first and second UPS modules installed at respective first and second UPS module locations of the plurality of UPS module locations and having respective first and second power outputs configured to be coupled to respective first and second power supply inputs of a data center equipment rack. At least one of the first and second UPS modules includes an inverter submodule and a switch submodule configured to selectively bypass the inverter module.

In some embodiments, both of the first and second UPS modules may be configured to provide a standby mode of UPS operation and the first and second UPS modules may be configured to receive power from respective first and second AC sources. The system may further include at least one computer equipment rack having first and second power inputs connected to respective ones of the first and second power outputs of the first and second UPS modules.

In further embodiments, the first UPS module may be configured to support a standby mode of operation and the second UPS module may be configured to support an on-line mode of UPS operation. The system may further include at least one first computer equipment rack coupled to the first UPS module and at least one second computer rack coupled to the second UPS module.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 1:
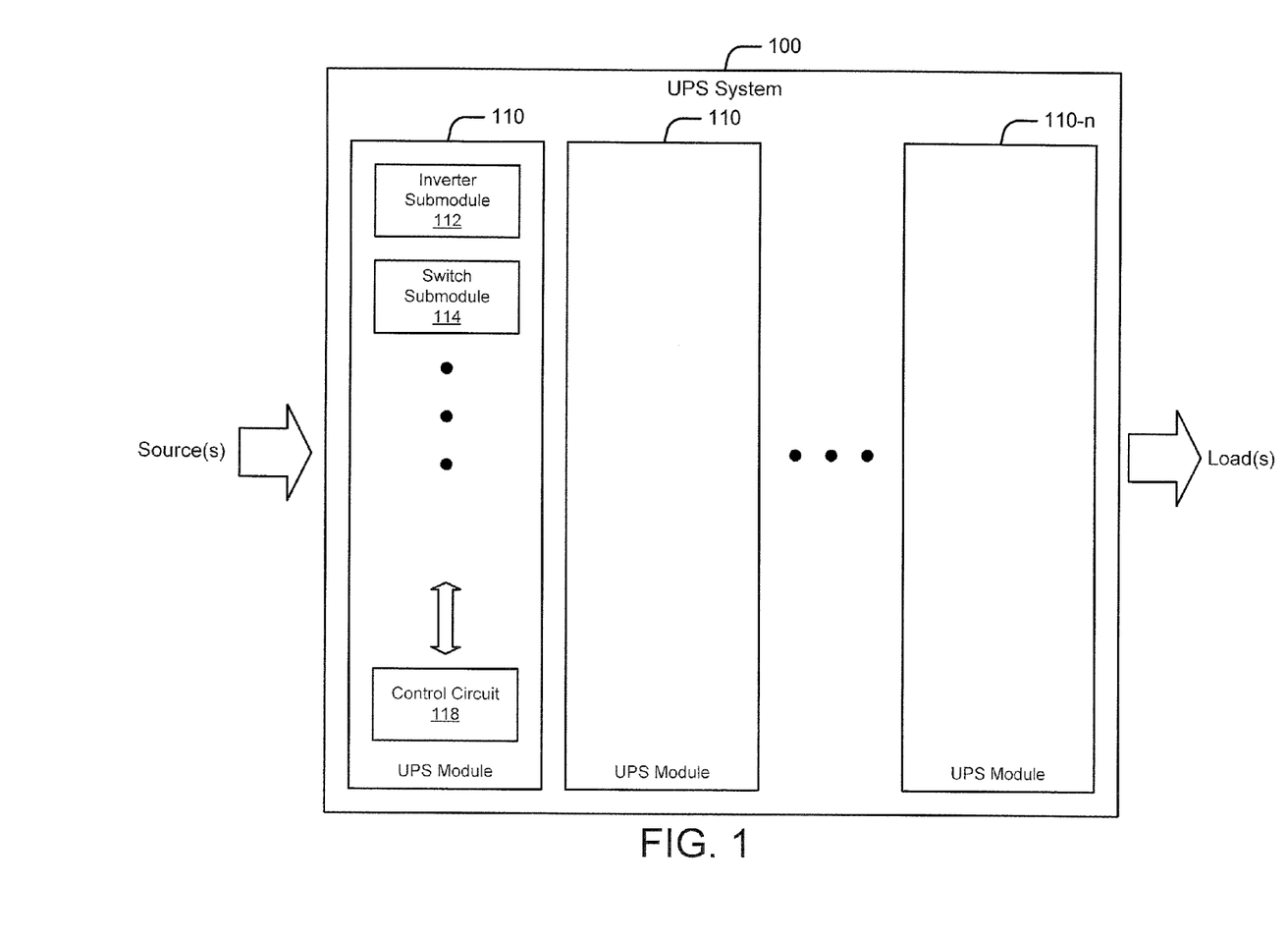
FIG. 1 is a schematic diagram illustrating a UPS system according to some embodiments.
Figure 2:
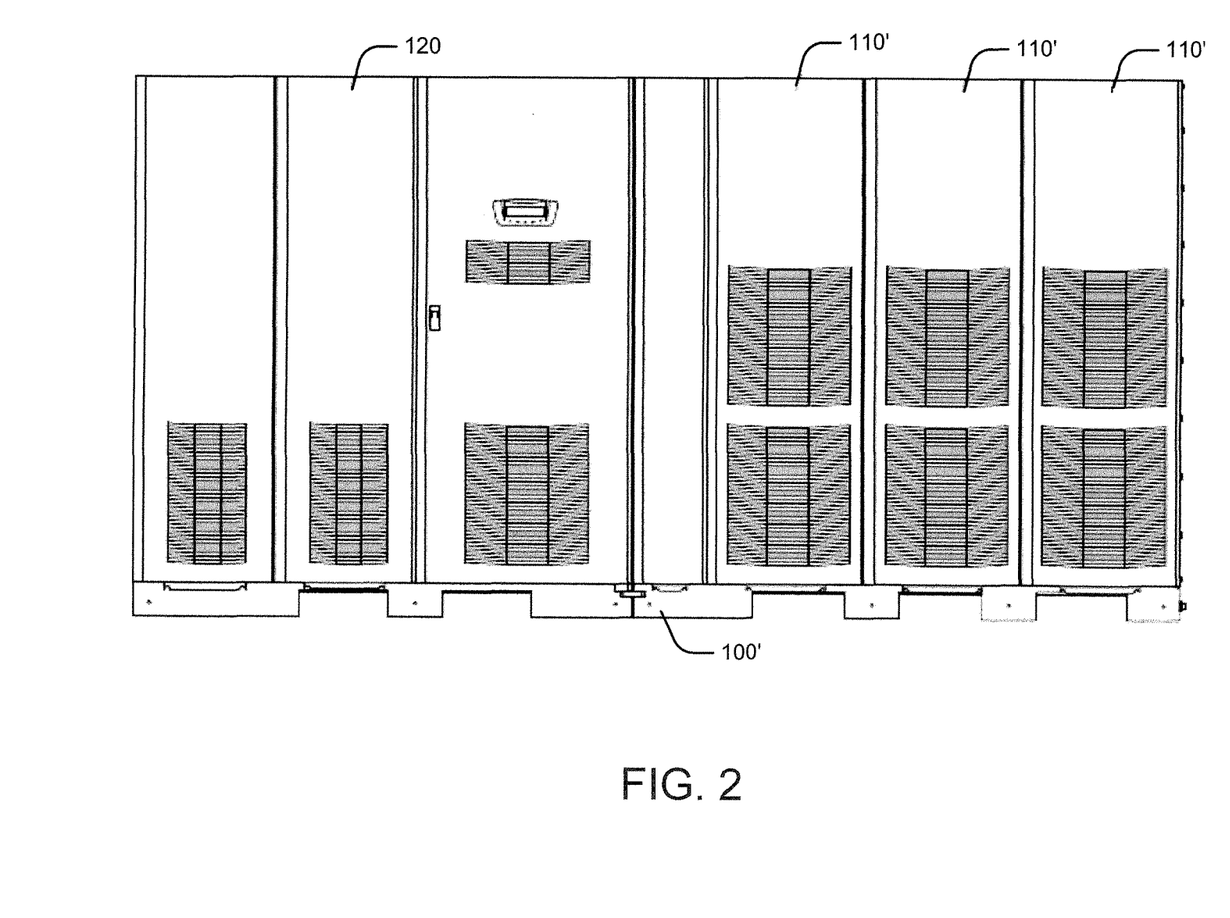
FIG. 2 is a front elevation view of a module UPS system according to some embodiments.

FIG. 1 illustrates a UPS system 100 according to some embodiments. The system 100 includes a plurality of UPS modules 110 arranged in an integrated fashion. For example, as shown in FIG. 2, UPS modules 110' may comprise respective modular cabinets configured to be joined to form an integrated UPS system 100'. As also shown in FIG. 2, the UPS system 100' may include additional components, such as may be housed in an additional cabinet 120. Such components may include, for example, monitoring, communication and user interface circuitry, bypass switches, circuit breakers, and the like. It will be appreciated that modular physical configurations other than that illustrated in FIG. 2 may be used in some embodiments. For example, rather than employing cabinets that are configured to be joined together as shown in FIG. 2, a modular UPS system accordingly to some embodiments may include a system chassis or similar structure configured to receive UPS modules and other components in defined slots, compartments and/or other structures of the chassis.

Referring again to FIG. 1, at least one UPS module 110 may be configured to operate as a standby (or "off-line") UPS, which selectively provides AC power directly from an AC source, (e.g., a utility or generator) to a load connected to the UPS module 110 and, in the event of failure of the AC source, from an auxiliary power supply, such as one or more batteries. As shown, the UPS may include a plurality of submodules including, for example, an inverter submodule 112 and a switch submodule 114. The inverter submodule 112 may be configured to generate AC power for delivery to a load from DC power supplied by a backup power source, such as a battery or bank of batteries. The battery(s) may be included in the UPS system 100 and/or may be located external to the UPS system 100 and connected thereto by cables or other conductors. The switch submodule 114 may be configured to provide a switchable bypass path between the AC source and the load. Each of the UPS modules 110 may be configured as such, or other ones of the UPS modules 110 may be configured to provide other UPS operational modes, such as on-line ("double conversion") modes, using different submodule configurations.

Figure 3:
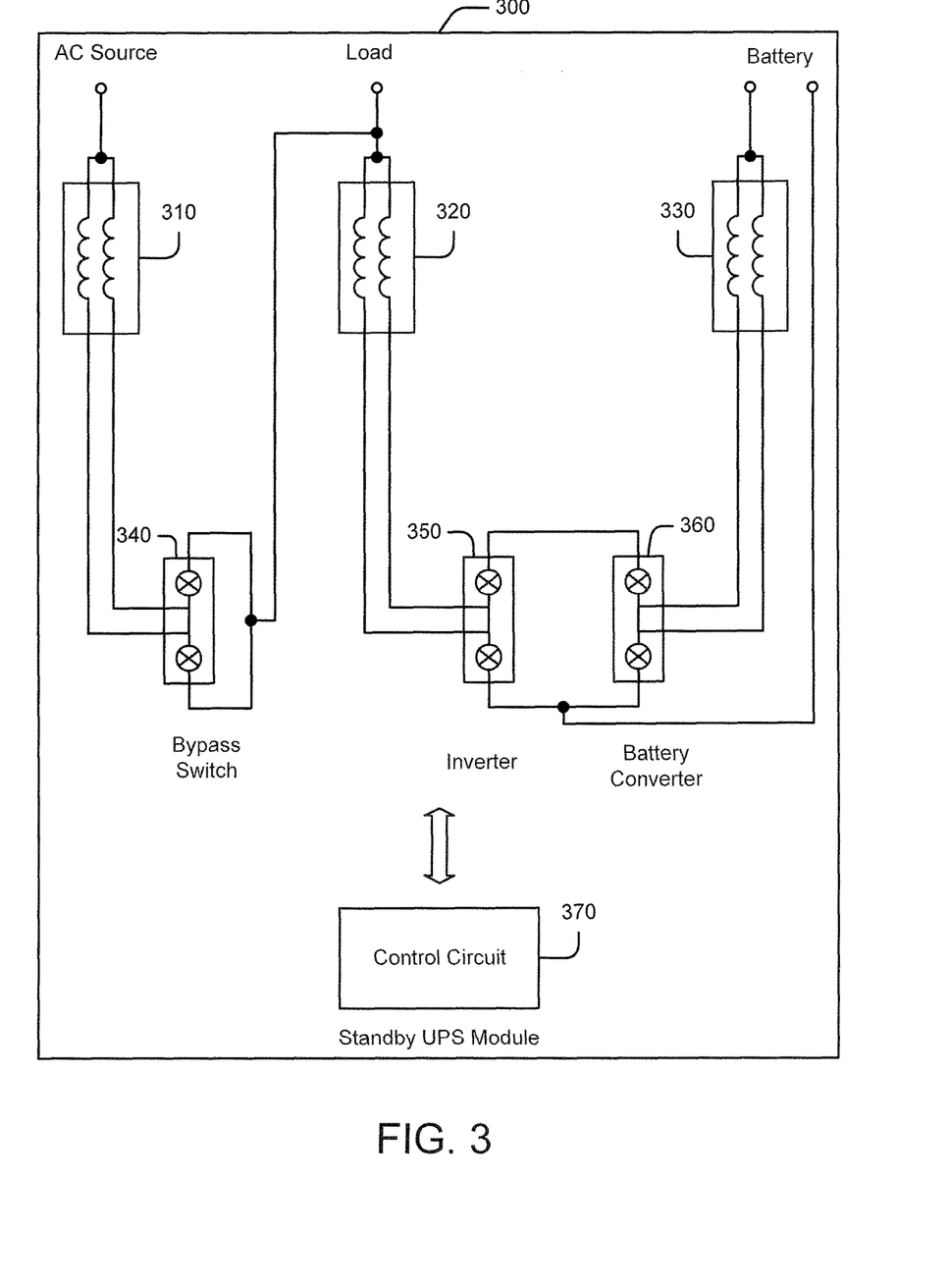
FIG. 3 is a schematic diagram illustrating a UPS module with a bridge circuit submodule configured as a bypass switch according to some embodiments.

According to some embodiments, UPS modules, such as the UPS modules 110 of FIG. 1, may share a common architecture that may be configured to provide standby, on-line and/or other modes of UPS operation. FIG. 3 illustrates a UPS module 300 having a modular arrangement including first, second and third inductor assemblies 310, 320, 330, and first, second and third bridge circuit submodules 340, 350, 360. As show, each of the bridge circuit submodules 340, 350, 360 may be configured as switching devices (e.g., IGBTs) coupled in a half-bridge leg arrangement. It will be appreciated that the bridge circuit submodules 340, 350, 360 may each include one more half-bridge legs to support single or 3-phase operation.

The second bridge circuit submodule 350 is coupled to an AC output of the UPS module 300 via the second inductor assembly 320 and is configured to provide inverter operation in conjunction with the second inductor assembly 320. The third bridge circuit submodule 360 shares a DC bus connection with the second bridge circuit submodule 350 and operates in conjunction with the third inductor assembly as a DC/DC battery converter.

The first bridge circuit submodule 340 is configured to provide a bypass switch functionality. The first bridge circuit submodule 340 may provide a relatively low loss bypass path between an AC input of the UPS module 300 and an AC output of the UPS module 300 such that, under normal conditions, AC power is delivered to the load without conversion within the UPS system 300. The first inductor assembly 310 is coupled in series with the first bridge circuit submodule 340. A control circuit 370 is configured to control the bridge circuit submodules 340, 350, 360 and other components of the UPS module 300.

Figure 4:
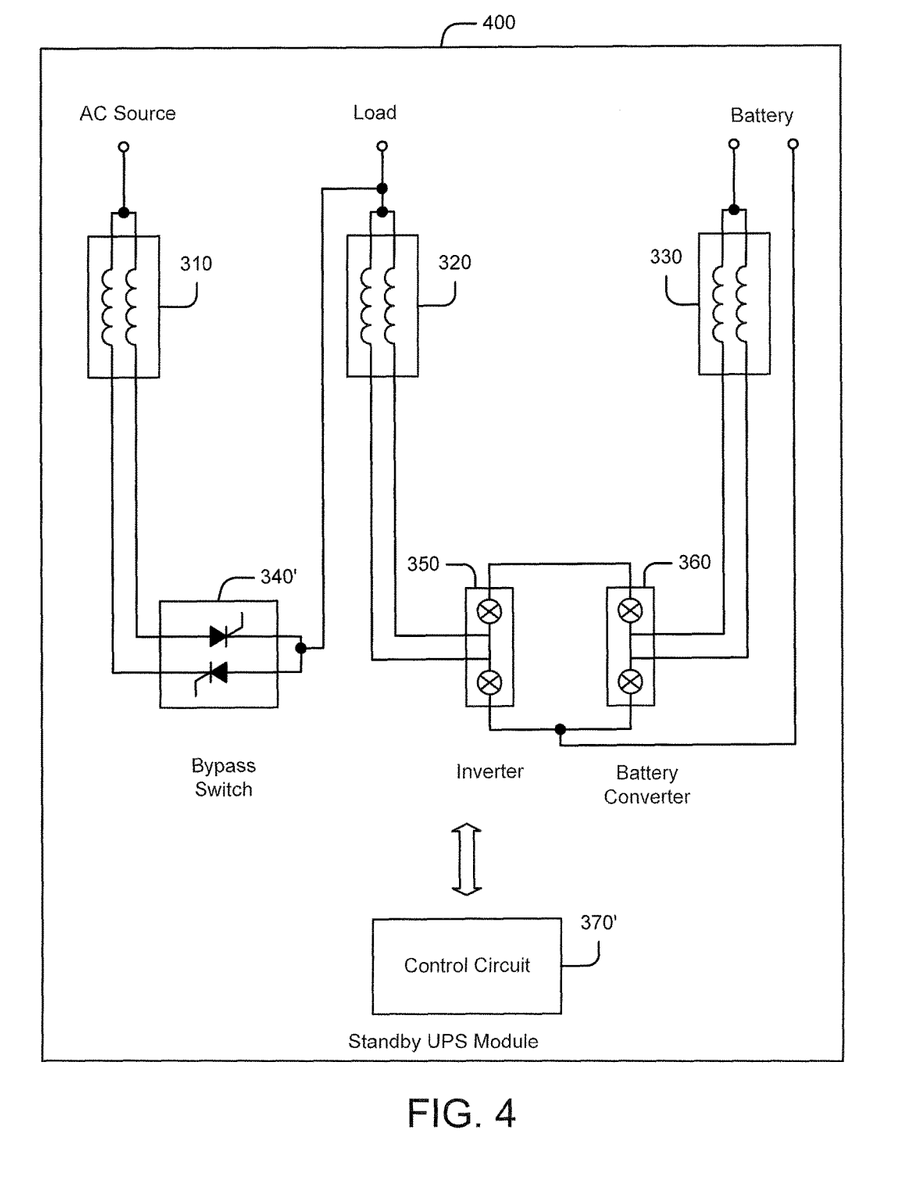
FIG. 4 is a schematic diagram illustrating a UPS module with an SCR switch submodule configured as a bypass switch according to further embodiments.

FIG. 4 illustrates an alternative arrangement for a standby UPS module 400. The UPS module 400 includes inductor assemblies 310, 320, 330 and inverter and battery converter bridge circuit submodules 350, 360 as described above with reference to FIG. 3. However, in place of the bridge circuit submodule 340 of FIG. 3, the UPS module 400 includes a bypass switch implemented using a SCR-based static switch submodule 340'. A control circuit 370' may be configured to monitor and control the static switch submodule 340' and other components of the UPS module 400.

Figure 5:
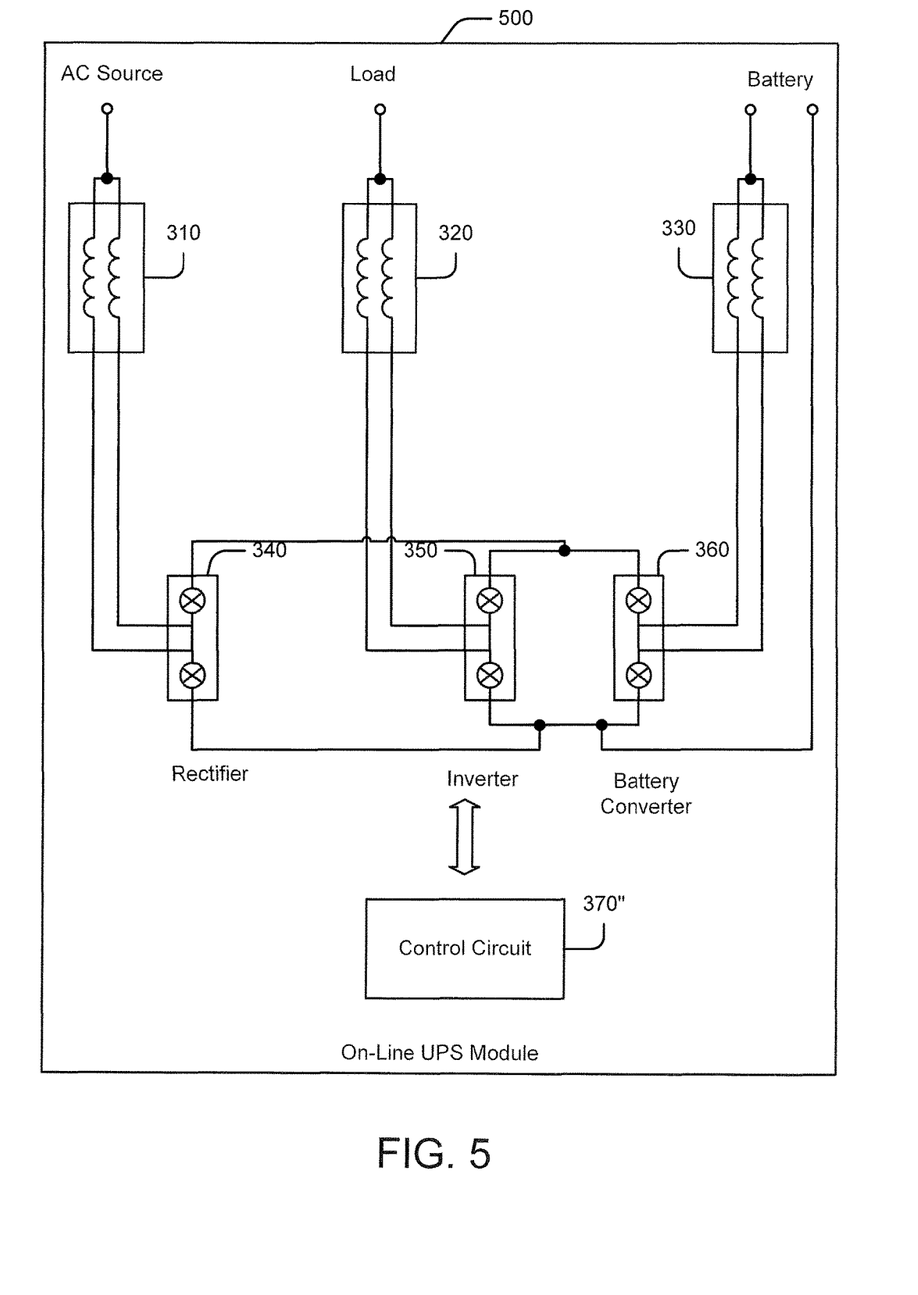
FIG. 5 is a schematic diagram illustrating a UPS module with a bridge circuit submodule configured to support rectifier operation according to some embodiments.

Referring to FIG. 5, an on-line (double conversion) UPS module 500 may use the same submodule architecture as the standby modules illustrated in FIGS. 3 and 4. In an on-line UPS module 500, the second and third bridge circuit submodules 350, 360 are still configured to provide inverter and battery converter operation but, instead of being configured to operate as a bypass switch, the first bridge circuit submodule 340 is configured to support operation, in conjunction with the first inductor assembly, as a boost rectifier that shares a DC bus connection with the second and third bridge circuit submodules 350, 360.

As noted above, the UPS modules 300, 400, 500 described above may share a common architecture that allows the modules to be flexibly used in a UPS system to support standby, on-line and other operational schemes. It will be appreciated that the UPS modules 300, 400, 500 may, for example, use replaceable submodules, such as the bridge circuit submodule 340 and the SCR submodule 340', which may, for example, be interchangeably installable in designated locations, such as in predetermined mechanical/electrical structures within a UPS module. Such locations may, for example, be configured to provide pluggable or other flexible electrical connections for submodules. Submodules installed in such locations may use common form factors, control circuitry and cooling systems. For example, the control circuitry of a UPS module may be configured to flexibly support operation of different types of submodules in a giving submodule location. For, the control circuits 370, 370', 370" of FIGS. 3-5 may be implemented using a common control circuit that may be flexibly configured, e.g., using software and/or reconfigurable hardware, to support the operation of different types of submodules in the various submodule locations. The control circuits 370, 370', 370" may include, for example, contactors and/or other devices used to control connectivity between the submodules and other components of the UPS modules.

Configuration of electrical interconnections to, from and within the submodules to support various operations, e.g., as a bypass switch or a rectifier, may be achieved by changing wiring manually and/or by actuating switching devices (e.g., contactors) to provide interconnections that support the desired use. In some embodiments, submodules may themselves be reconfigurable to perform various functions by wiring changes and/or actuation of switches within the submodules. For example, in some embodiments, a bridge circuit submodule may be reconfigurable to provide the bypass switch and rectifier operational modes described for the submodules 340, 340' of FIGS. 3 and 5.

Figure 6:
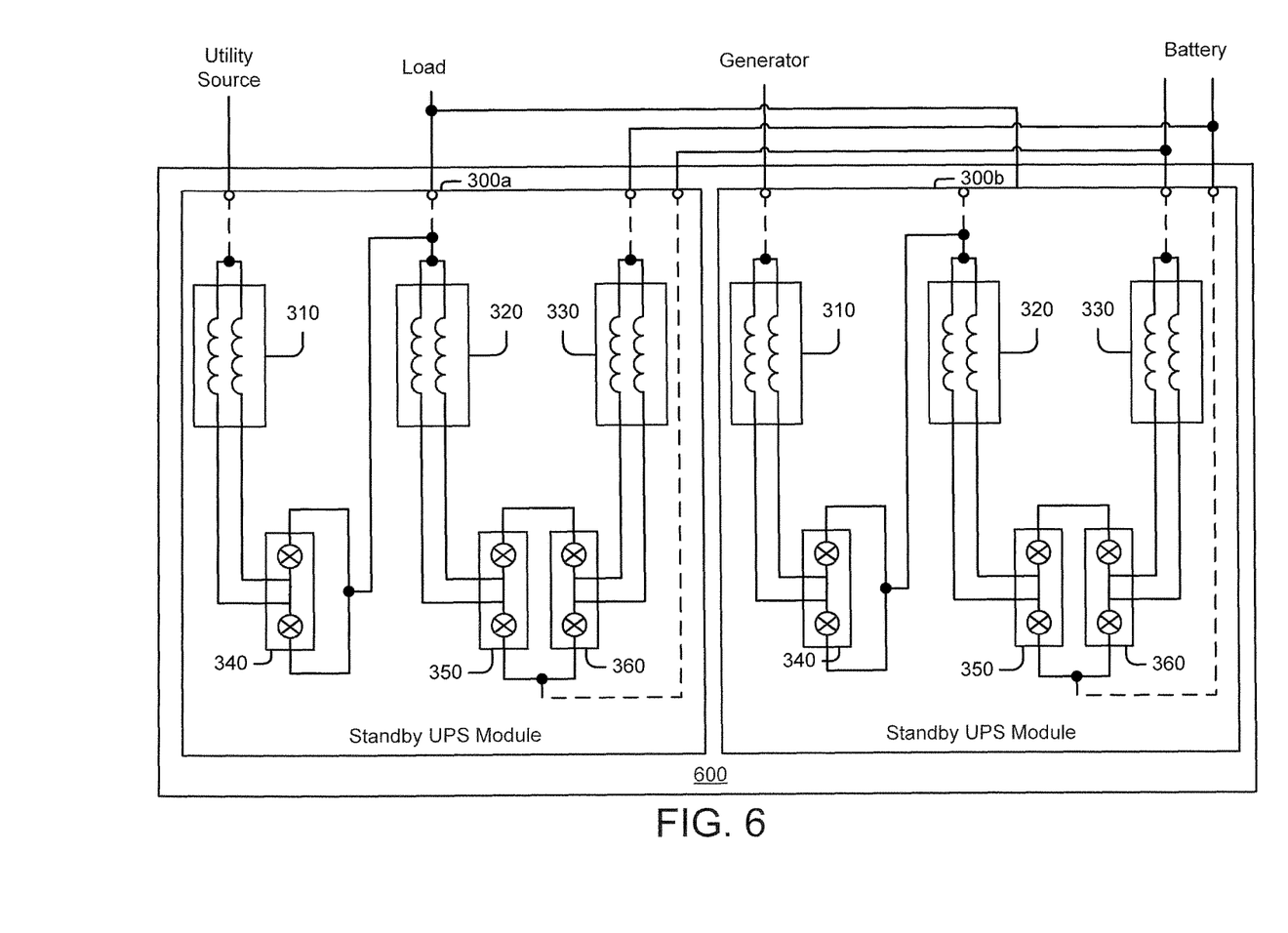
FIG. 6 is a schematic diagram illustrating a UPS system with standby UPS modules configured to provide power to a common load according to some embodiments.

Modular UPS systems according to some embodiments may be used to provide flexible UPS system arrangements. For example, referring to FIG. 6, a UPS system 600 may include first and second standby UPS modules 300a, 300b along the lines described above with reference to FIG. 3. As shown, the first and second UPS modules 300a, 300b may be coupled in common to a load and to a battery. Respective AC sources, such as a utility source and a local generator (e.g., a diesel/electric generator set), may be coupled to respective ones of the first and second UPS modules 300a, 300b to provide source redundancy. Under normal conditions, power may be supplied from the AC utility directly to the load via the bypass switch submodule 340 of the first UPS module 300a. Upon failure of the utility source, the load may be carried by the inverter submodule 350 of the first UPS module 300 until the local generator comes on line and the load is transferred to the switch module 340 of the second UPS module 300b. This arrangement may support relatively high-efficiency operation, as power may be directly provided to the load from the AC sources without passing through a double-conversion rectifier/inverter combination.

Figure 7:
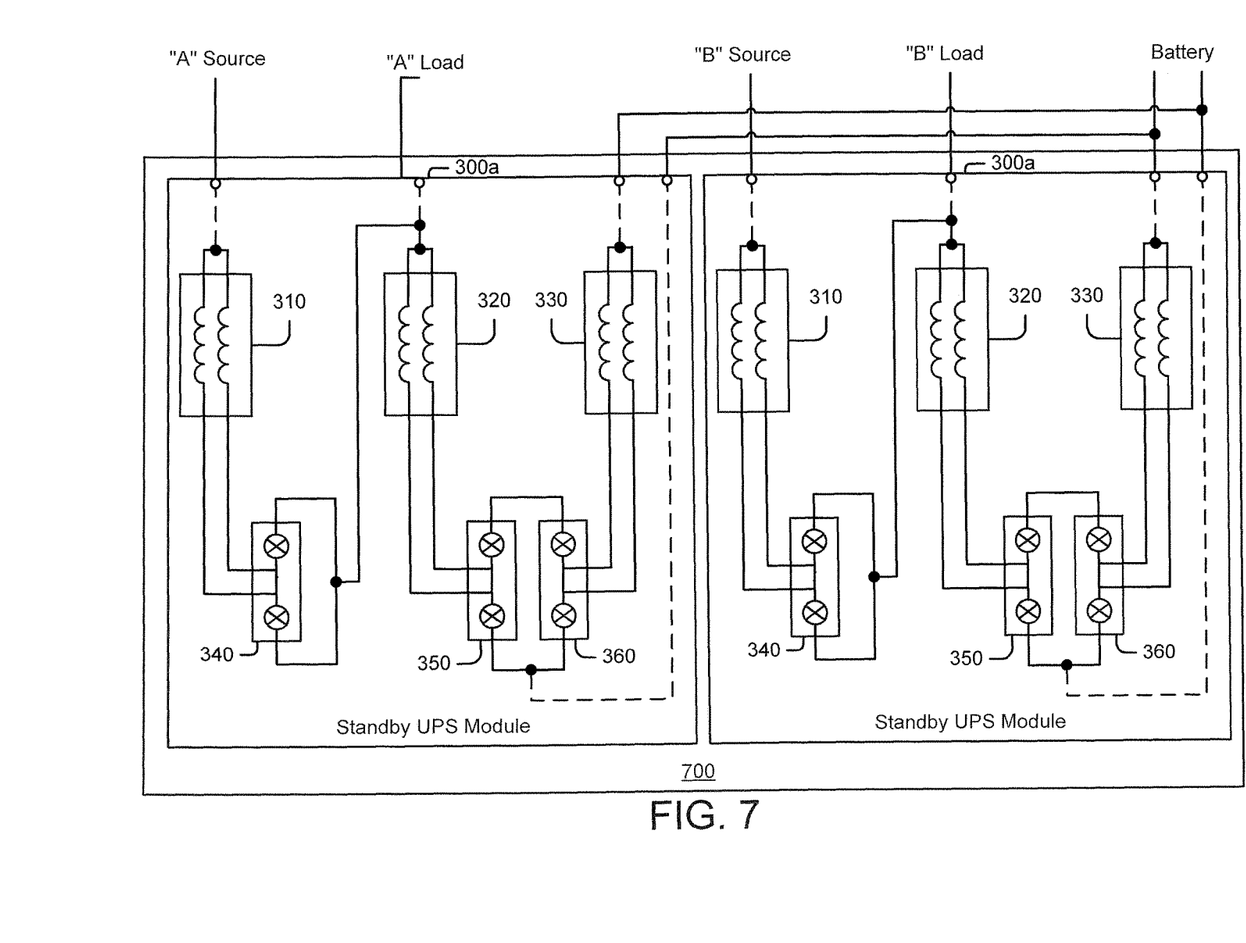
FIG. 7 is a schematic diagram illustrating a UPS system with standby UPS modules arranged in an A/B configuration according to some embodiments.
Figure 9:
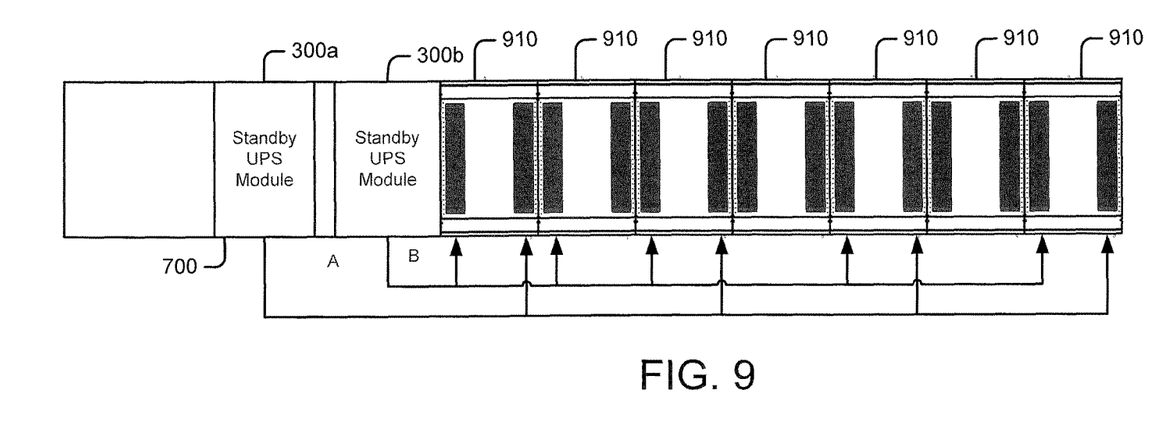
FIG. 9 is a schematic diagram illustrating provision of power to a row of server racks from a modular UPS system in an A/B configuration according to some embodiments.

FIG. 7 illustrates a UPS system 700 using first and second standby UPS modules 300a, 300b configured to support an "A/B" dual power configuration, such as might be used with dual power input racks in a datacenter application. Some server racks are configured with redundant dual power supplies ("A" and "B") that are designed to be fed from separate power sources. The first standby UPS module 300a may be coupled to an "A" source and configured to provide power to "A" power inputs of one or more racks, while the second standby UPS module 300b may be coupled to a "B" source and configured to provide power to "B" power inputs of the one or more racks. Such an arrangement is illustrated in FIG. 9, which shows connection of first and second UPS modules 300a, 300b of a UPS system 700 along the lines shown in FIG. 7 to a row of server racks 910. The UPS system 700 may support redundancy for the AC sources and the rack power supplies, with battery backup available for either of the UPS modules 300a, 300b. This arrangement may also support relatively high-efficiency operation, as power may be directly provided to the load from the AC sources without passing through a double-conversion rectifier/inverter combination.

Figure 8:
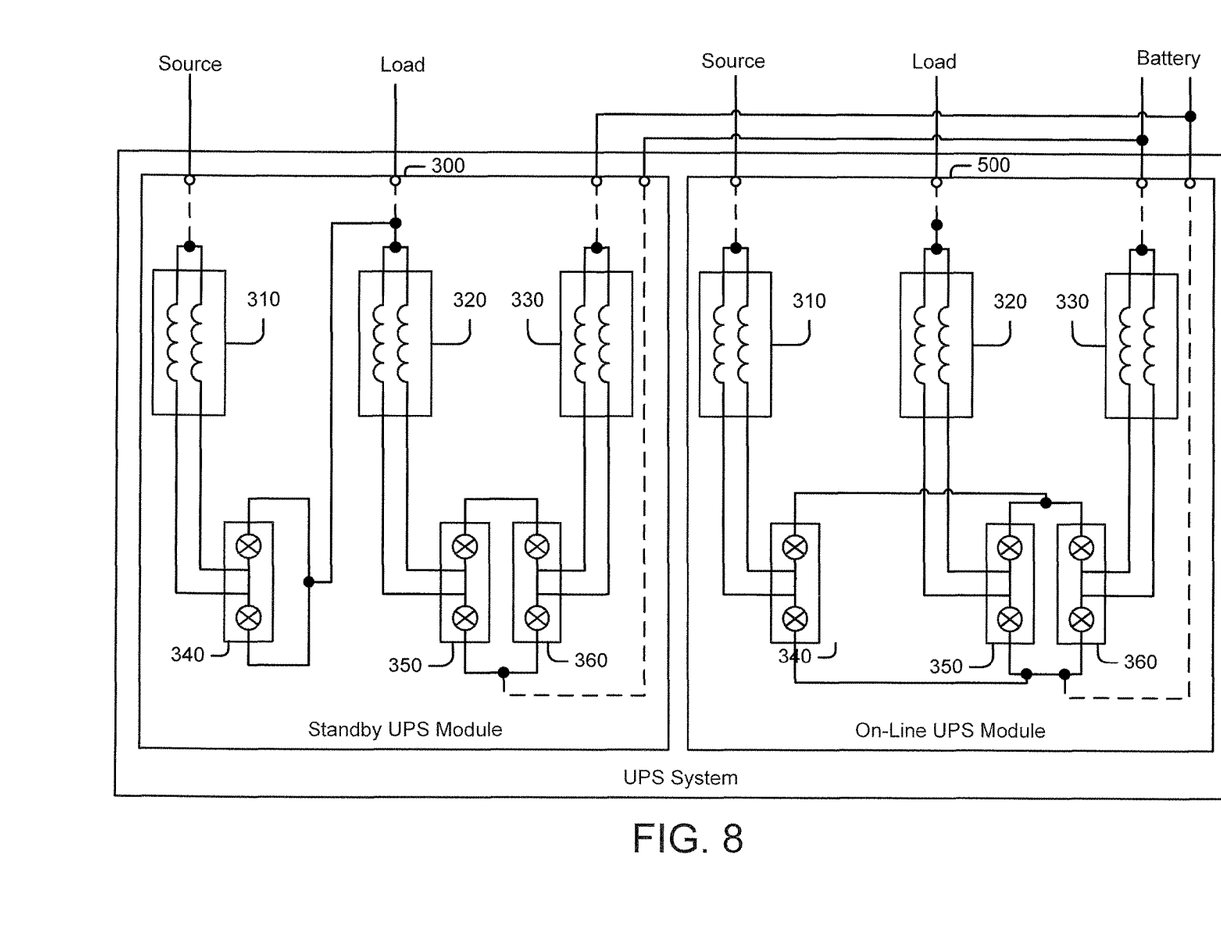
FIG. 8 is a schematic diagram illustrating a UPS system with standby and on-line UPS modules according to further embodiments.

UPS systems according to some embodiments may also support combinations of standby and on-line UPS modules. FIG. 8 illustrates a UPS system 800 including a standby UPS module 300 along the lines illustrated in FIG. 3 and an on-line UPS module 500 along the lines illustrated in FIG. 5. A first source and a first load are coupled to the standby UPS module 300. A second source and a second load are coupled to the on-line UPS module 500. The first and second sources may be the same or different.

Figure 10:
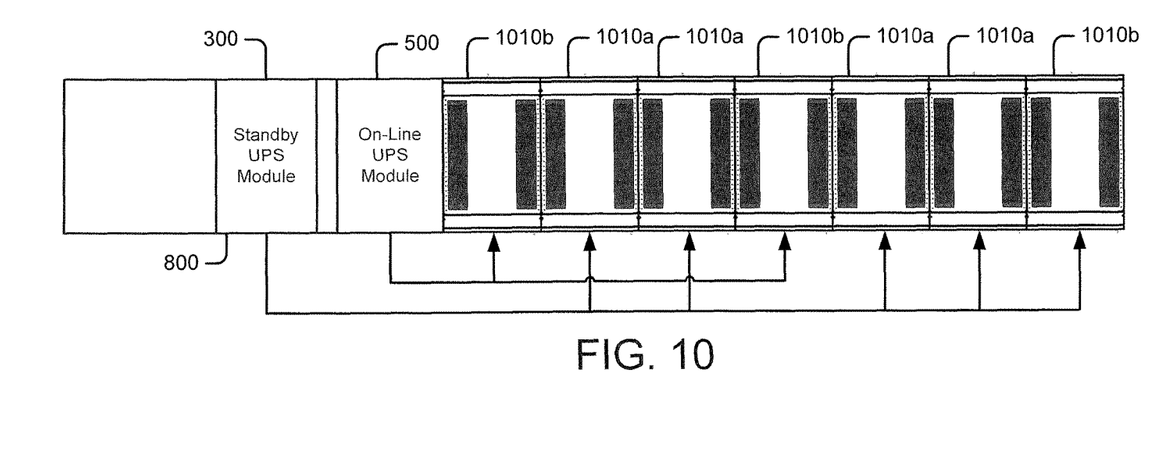
FIG. 10 is a schematic diagram illustrating selective provision of power to a row of server racks from standby and on-line modules of a modular UPS according to further embodiments.

An example application for the UPS system 800 is illustrated in FIG. 10, wherein the standby UPS module 300 provides power to first racks 1010a, while the on-line UPS module 500 provides power to second racks 1010b. The first racks 1010a may, for example, house servers that perform computing tasks that are less critical and/or may be mirrored or otherwise backed up by computing resources located elsewhere, such as the case in some cloud computing applications. For such loads, reducing aggregate energy consumption may be more important than reliability/availability of a given rack/server. The standby UPS arrangement can reduce the number of loss-incurring components in the power path in comparison to on-line configurations while still providing backup power capabilities. The second racks 1010b may house servers that perform more critical tasks for which reliability and availability is more important which require additional power conditioning and other performance characteristics that an on-line UPS configuration may provide. The UPS system 800 may also include a separate static bypass switch to provide bypass capability for the on-line UPS module 500. Such a bypass switch may be used, for example, to support higher efficiency modes in which the bypass is use to provide a reduced-loss path to the load when the source is within nominal parameters.

The modular architecture of the UPS module 300 can provide additional benefits that may not be available in conventional direct-feed arrangements. For example, the inductor assembly 310, which serves as an energy storage device in on-line UPS module configurations, can serve as a current limiter in standby UPS module configurations. In addition, current and/or voltage sensors and monitor use for rectifier control in on-line UPS module configurations can be dual-purposed to provide current and/or voltage monitoring in standby UPS module configurations. In some embodiments, using a bridge circuit submodule as a bypass switch for standby UPS operation may also afford the opportunity for more sophisticated control of power input than available in conventional direct-feed configurations.

Figure 11:
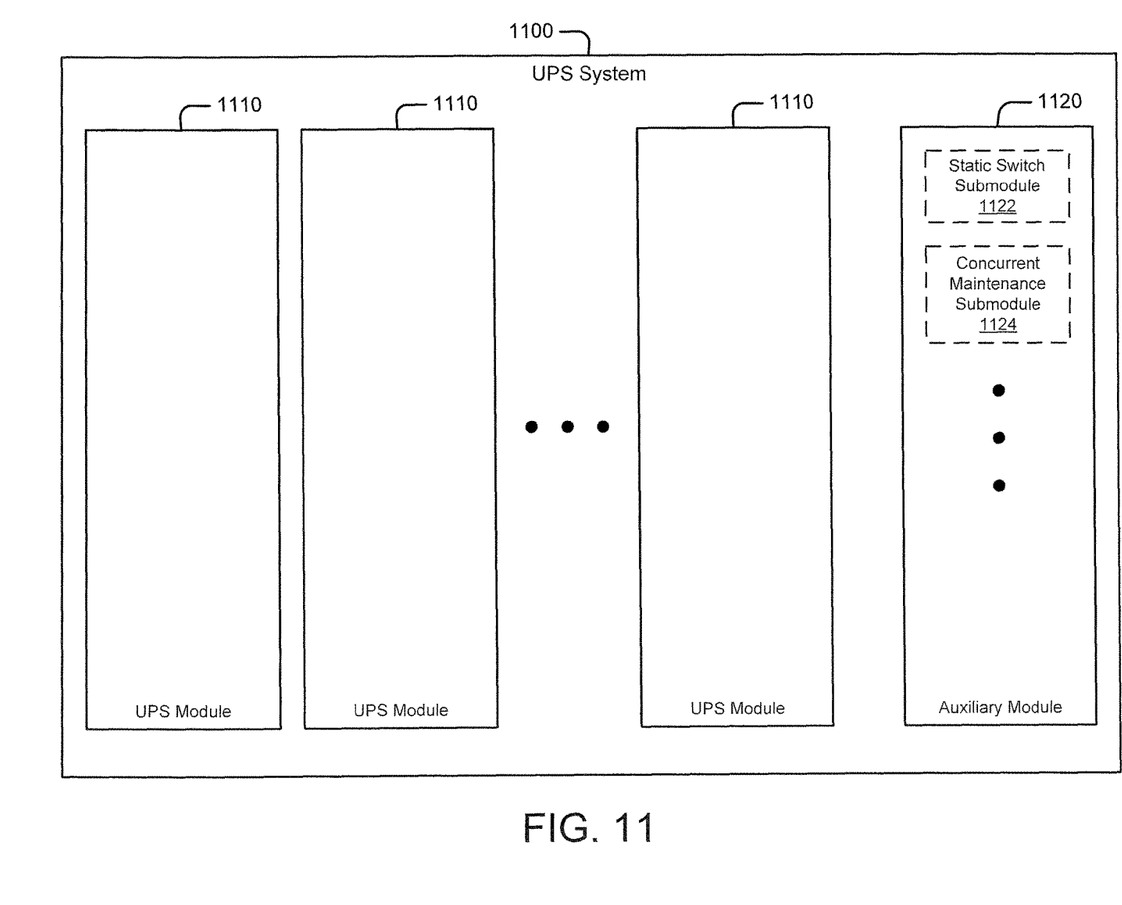
FIG. 11 is a schematic diagram illustrating a UPS system according to further embodiments.

FIG. 11 illustrates a UPS system 1100 with a modular architecture according to further embodiments. The UPS system 1100 includes a plurality of UPS module locations at which UPS modules 1110 may be located. For example, as explained above with reference to FIG. 2, the UPS module 1110 may be cabinet-like assemblies configured to be joined to form an integrated unit or may be configured to be installed in slots or similar structures in a common chassis. The UPS system further includes at least one auxiliary module 1120. The auxiliary module 1120 may be configured to receive functional submodules that may be selected based on functional requirements of the UPS modules 1110. For example, if one or more of the UPS modules 1110 is a standby UPS module, the auxiliary module 1120 may have, for example, one or more concurrent maintenance submodule 1124 installed therein, which may include circuit breakers and/or other devices that allow selective disconnection of the standby UPS module from the power source and/or load while enabling other UPS modules 1110 in the system 1100 to continue operation. As further shown, the auxiliary module 1120 may also be configured to receive one or more submodules that support operation of on-line UPS modules, such as a static bypass switch submodule 1122.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An uninterruptible power supply (UPS) comprising:
a first bridge circuit module;
a second bridge circuit module; and
a control circuit configured to operate the first bridge circuit module as an inverter and to selectively operate the second bridge circuit module as a bypass switch in a first mode and as a rectifier in a second mode.

2. The UPS of claim 1, wherein the control circuit is configured to operate the second bridge circuit module as bypass switch in a standby UPS mode and to operate the second bridge circuit module as a rectifier in an on-line UPS mode.

3. The UPS of claim 2, wherein a first port of the second bridge circuit module is configured to be coupled to an AC power source, wherein a first port of the first bridge circuit module is configured to be coupled to a load and wherein a second port of the second bridge circuit module is configured to be alternatively coupled to a second port of the first bridge circuit module to support the on-line UPS mode or to the load to support the standby UPS mode.

4. The UPS of claim 1, further comprising a third bridge circuit module configured to couple a DC source to the first bridge circuit module.

5. The UPS of claim 1, further comprising a first inductor coupled to a first port of the second bridge circuit module and a second inductor coupled to first port of the first bridge circuit module.

6. A system comprising:
a plurality of UPS modules, each comprising a first bridge circuit submodule, a second bridge circuit submodule, and a control circuit configured to operate the first bridge circuit submodule as an inverter and to selectively operate the second bridge circuit submodule as a bypass switch in a first mode and as a rectifier in a second mode.

7. The system of claim 6, wherein a first UPS module of the plurality of UPS modules is configured to operate its second bridge circuit submodule as bypass switch to operate the first UPS module in a standby UPS mode and wherein a second UPS module of the plurality of UPS modules is configured to operate its second bridge circuit submodule as a rectifier to operate the second UPS module in an online UPS mode.

8. The system of claim 7, further comprising at least one first computer equipment rack coupled to the first UPS module and at least one second computer rack coupled to the second UPS module.

9. A UPS comprising:
an inductor configured to be coupled to an AC power source;
a bridge circuit coupled to the inductor; and
a control circuit configured to selectively operate the bridge circuit as a bypass switch in a first mode and as a rectifier in a second mode.

10. The UPS of claim 9, further comprising an inverter having an output configured to be coupled to a load and wherein the control circuit is configured to selectively operate the bridge circuit as a bypass switch that couples the AC power source to the load to bypass the inverter and as a rectifier that provides a DC voltage to an input of the inverter.

11. The UPS of claim 10, wherein the bridge circuit comprises a first bridge circuit and wherein the inverter comprises a second bridge circuit.

12. The UPS of claim 11, wherein the first and second bridge circuits are configured as interchangeable modules.

13. The UPS of claim 11, further comprising a third bridge circuit configured to couple a DC power source to the second bridge circuit.

* * * * *